US011325279B2

(12) United States Patent
Nielsen

(10) Patent No.: US 11,325,279 B2
(45) Date of Patent: May 10, 2022

(54) ARCHITECTURAL BLOCKS WITH STONE-LIKE APPEARANCE AND METHOD OF MANUFACTURE

(71) Applicant: Tuscan Stoneworx USA, LLC, Orem, UT (US)

(72) Inventor: Mat T. Nielsen, Springville, UT (US)

(73) Assignee: TUSCAN STONEWORX USA, LLC, Lindon, UT (US)

( * ) Notice: Subject to any disclaimer, the term of this patent is extended or adjusted under 35 U.S.C. 154(b) by 326 days.

(21) Appl. No.: 16/690,702

(22) Filed: Nov. 21, 2019

(65) Prior Publication Data

US 2020/0198181 A1    Jun. 25, 2020

Related U.S. Application Data

(60) Provisional application No. 62/781,779, filed on Dec. 19, 2018.

(51) Int. Cl.
*B28B 19/00* (2006.01)
*B44F 9/04* (2006.01)

(52) U.S. Cl.
CPC ............ *B28B 19/0053* (2013.01); *B44F 9/04* (2013.01)

(58) Field of Classification Search
CPC ....... B28B 19/0053; B28B 19/00; B28B 1/30; B44F 9/04
See application file for complete search history.

(56) References Cited

U.S. PATENT DOCUMENTS

| | | | | |
|---|---|---|---|---|
| 772,476 | A * | 10/1904 | Podmore | B28B 23/0075 427/202 |
| 2,588,595 | A | 3/1952 | Warner | |
| 2,601,532 | A * | 6/1952 | Knighton | B28B 19/00 264/71 |
| 2,751,775 | A * | 6/1956 | Sergovic | B28B 11/04 428/78 |
| 3,155,529 | A | 11/1964 | Paturzo | |
| 3,712,825 | A | 1/1973 | Yocum | |
| 3,799,716 | A | 3/1974 | Salts | |
| 3,853,577 | A * | 12/1974 | Nishida | B05D 7/544 427/270 |
| 5,002,620 | A | 3/1991 | King | |

(Continued)

FOREIGN PATENT DOCUMENTS

CN     101480784    7/2009
FR     2564124      11/1985
(Continued)

*Primary Examiner* — Kelly M Gambetta
*Assistant Examiner* — Virak Nguon
(74) *Attorney, Agent, or Firm* — Workman Nydegger

(57) ABSTRACT

The present disclosure describes architectural blocks configured to give the appearance of real cut stone. A plaster composition may be applied to one or more surfaces of a block, such as a concrete masonry unit (CMU) to form an architectural block having the appearance of cut stone. The plaster composition includes a cementitious component, such as white Portland cement, a limestone aggregate component, and optionally an adhesive component. The limestone aggregate component includes a fine sand portion and a coarse sand portion that effectively enable the appearance of cut stone after finishing of the plaster surface via sanding and/or polishing.

20 Claims, 2 Drawing Sheets

(56) References Cited

U.S. PATENT DOCUMENTS

| | | | | |
|---|---|---|---|---|
| 5,794,401 A * | 8/1998 | Shaw | ............ | C04B 28/02 |
| | | | | 427/202 |
| 6,528,120 B2 | 3/2003 | Brown | | |
| 6,569,923 B1 * | 5/2003 | Slagter | ............ | C04B 28/04 |
| | | | | 524/5 |
| 2002/0157577 A1 * | 10/2002 | Sullivan | ............ | C04B 41/65 |
| | | | | 106/737 |
| 2017/0298626 A1 * | 10/2017 | Shaw | ............ | C04B 28/02 |
| 2018/0230057 A1 * | 8/2018 | Guynn | ............ | C04B 28/04 |
| 2019/0099915 A1 * | 4/2019 | Adams | ............ | B41M 5/0047 |

FOREIGN PATENT DOCUMENTS

| | | |
|---|---|---|
| GB | 624377 | 6/1949 |
| KR | 100737433 | 11/2006 |

* cited by examiner

ARCHITECTURAL BLOCKS WITH STONE-LIKE APPEARANCE AND METHOD OF MANUFACTURE

CROSS-REFERENCE TO RELATED APPLICATIONS

This application claims the benefit of U.S. Provisional Application No. 62/781,779, filed Dec. 19, 2018, the disclosure of which is incorporated here by reference in its entirety.

BACKGROUND

Building structures such as walls are often built by organizing several individual masonry units into the structure. The masonry units may be pieces of cut stone, such as marble, granite, travertine, sandstone, or limestone. More frequently, the masonry units are some form of brick. Bricks are typically laid together in an alternating pattern of offset courses and joined together using mortar. The relatively smaller bricks often seen in residential applications are typically made of clay combined with sand or other type of aggregate. These bricks are usually fired to provide suitable strength.

Concrete is also utilized to form masonry units. Masonry units formed from concrete are often referred to as cinder blocks, breeze blocks, hollow blocks, construction blocks, clinker blocks, and Besser blocks. The terms "concrete blocks" and "concrete masonry unit" (CMU) are often used to generally refer to all such varieties. Concrete blocks are made from cast concrete, which typically includes Portland cement and a suitable aggregate material. Lower cost concrete blocks often use industrial wastes such as low-quality fly ash or bottom ash as at least part of the aggregate. This is why such blocks are commonly referred to as "cinder blocks" in the U.S.

Concrete block is a useful, low cost building material and is particularly useful for forming the walls of buildings. Concrete blocks can be utilized for structural and/or architectural purposes. Despite these benefits, concrete blocks are typically considered to be unsightly or too "industrial" for many residential or business environments. They are most often used for utilitarian purposes of low esthetic value.

BRIEF SUMMARY

Disclosed herein are architectural blocks configured to give the appearance of cut stone and compositions and methods of manufacturing such architectural blocks. Architectural blocks may, for example, include concrete blocks such as standard CMUs as the core component or block substrate. Block substrates of fired clay, ceramic, unfired clay, or other materials can also be used. In one embodiment, an architectural block includes at least one surface having or treated with a plaster or other cementitious composition formulated to give the appearance of cut stone.

In some embodiments, the plaster composition includes a cementitious binder component and an aggregate. The cementitious binder component may include Portland cement, such as white cement or grey cement, alone or in combination with one or more supplementary cementitious materials (SCMs), such as fly ash, metakaolin, pumice, natural pozzolan, slag, or silica fume.

In some embodiments, the aggregate component can be one or more limestone aggregates, one or more silica aggregates, or a combination of limestone and silica aggregates of same or different size. In some embodiments, at least two gradations (or sizes) of aggregate can be used, such as two differently sized limestone aggregates, two differently sized silica aggregates, or a combination of differently sized limestone and silica aggregates.

In some embodiments, the aggregate component may include a fine sand portion and a coarse sand portion. The fine sand portion, which may be considered to be a filler and not an SCM, may have, for example, a D90 within a range of about 0.075 mm to 0.425 mm, or about 0.105 mm to 0.300 mm, or about 0.150 mm to 0.212 mm, and a D50 of 0.075 mm or less. The coarse sand portion may have, for example, a D90 within a range of about 0.425 mm to 2.80 mm, or about 0.60 mm to 1.70 mm, a D50 within a range of about 0.212 mm to 0.60 mm, or about 0.300 mm to 0.425 mm, and a D10 within a range of about 0.075 mm to 0.212 mm, or about 0.105 mm to 0.150 mm.

The use of two separate gradations of aggregate improves rheology and beneficially provides the appearance of real cut stone after the plaster composition has cured and finished. For example, the fine sand portion can provide workability and texture to the plaster while exposed grains of the coarse sand portion can provide the appearance of distributed crystal facets to the finished surface of the plaster. The resulting appearance beneficially resembles that of real cut stone.

A method of manufacturing an architectural block includes the steps of providing a block substrate and applying a plaster composition to at least one surface of the block substrate to form an intermediate architectural block comprising the block substrate and one or more plaster layers. The formed plaster layer may then be leveled by moving the block past a leveler, such as at least one of a leveling blade or roller, and then the plaster layer may be allowed to harden or cure.

Following sufficient hardening or curing of the plaster layer, the plaster layer may be finished using one or more sanders and/or other suitable polishing/finishing devices. The finishing process beneficially abrades the coarse sand portion of the plaster to form and/or expose the crystal facets that resemble those of cut stone. A polymer or other sealant may also be added to the finished surface to seal, waterproof, and/or protect the plaster layer.

Also disclosed herein are systems for manufacturing architectural blocks having the appearance of cut stone. In one embodiment, a system for manufacturing architectural blocks includes a conveyance system configured to convey one or more block substrates past a series of modifying machines. The modifying machines include: an applicator configured to apply a plaster or other cementitious composition to at least one surface of the block substrate to form a plaster layer; a leveler configured to slough off or remove excess plaster from an outer surface of the plaster layer; and one or more finishers, such as sanders and/or polishers, configured to abrade the surface of the plaster layer. The system may additionally include one or more of: a holding section for allowing the plaster layer to harden or cure prior to finishing; a cleaner configured to remove residual debris after finishing; and a sealer configured to apply a sealant to the surface of the plaster layer.

Additional features and advantages will be set forth in part in the description that follows, and in part will be obvious from the description, or may be learned by practice of the embodiments disclosed herein. It is to be understood that both the foregoing brief summary and the following

DETAILED DESCRIPTION

I. Architectural Blocks

The architectural blocks described herein are blocks that have been modified by applying a plaster composition to at least one surface of a block substrate. The block substrate can be a standard CMU, fired clay brick, ceramic block, or unfired clay block. In some embodiments, the block substrate may alternatively be a structural tile, gypsum block, or other construction unit capable of being arranged with multiple units to form a building structure. For simplicity, the following description will use the term "block" or "block substrate" to refer generally to the foregoing types of base substrates.

Particularly preferred embodiments utilize CMUs as block substrates, though it will be understood that the embodiments described herein are not limited solely to CMUs. In the United States, CMUs are commonly sized at about 16 in×8 in×8 in, though they may be varied in one or more dimensions by ±4 to 10 inches. For example, it may be desirable to use a CMU that is 24 in×8 in×8 in.

The plaster composition is formulated to provide a beneficial decorative appearance to the treated surface of the block substrate. The plaster composition may, for example, provide the appearance of cut stone. The architectural block can therefore be utilized in architectural and/or decorative applications with less expense and with greater design freedom as compared to actual cut stone.

Figure 1:
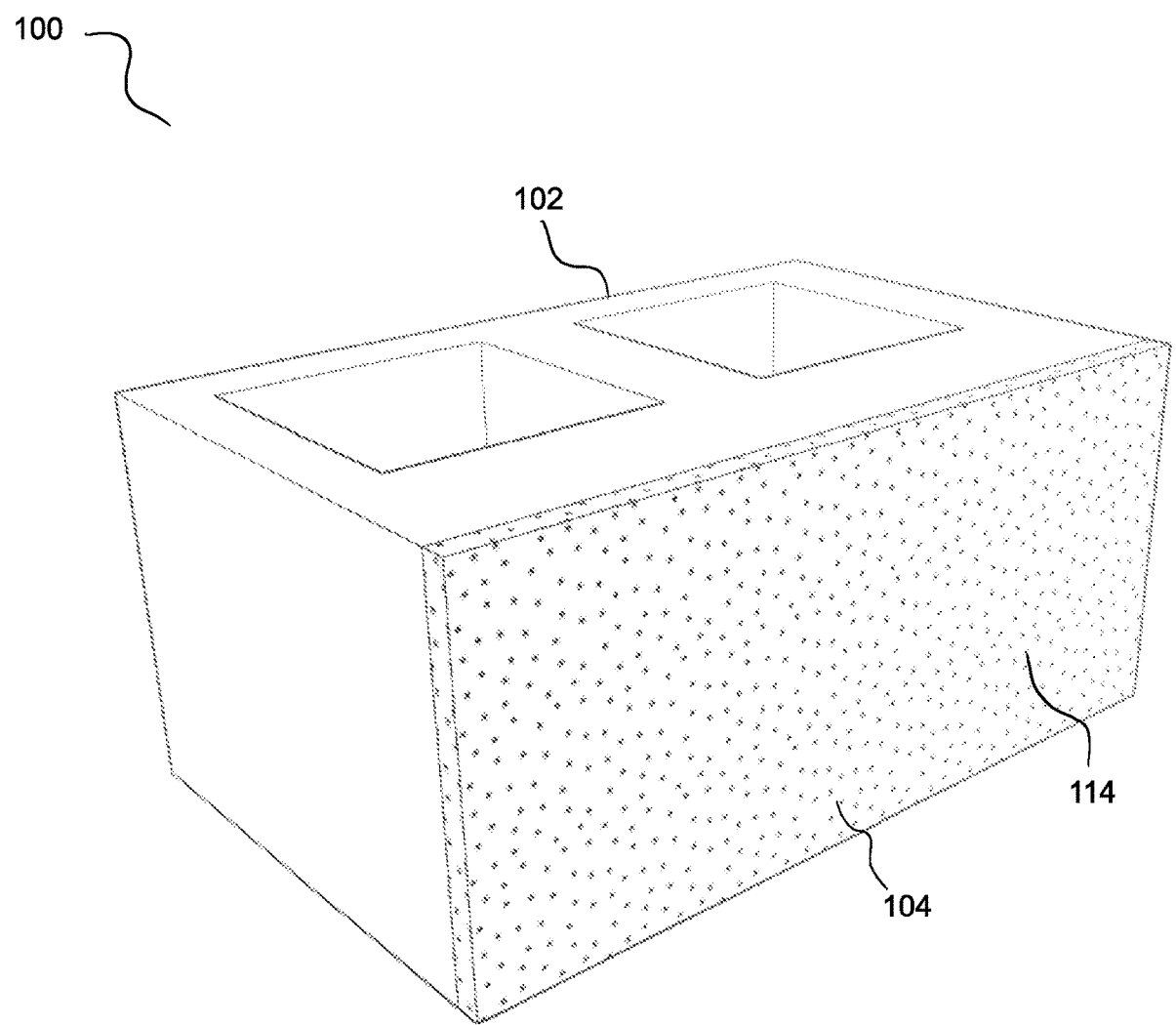
FIG. 1 illustrates an exemplary architectural block including a surface that has been formed or treated with a plaster composition formulated for providing the appearance of cut stone.

FIG. 1 is an isometric view of an exemplary architectural block 100 according to the present disclosure. The cuboid shape (e.g., a three-dimensional rectangular prism) of the block is typical of most blocks, though other embodiments may be shaped differently so long as they may be arranged with other units to form a building structure. For example, other embodiments of a "block substrate" may have a cube shape, a trapezoidal prism shape, a panel/tile shape, a shape with a polygonal cross-section, or a shape with one or more curved surfaces. Additionally, or alternatively, some embodiments may include corners and/or edges that are rounded, beveled, chamfered, or the like.

Typically, only a single surface of the architectural block 100 includes or is treated with the plaster composition 114 to form a decorative surface. Once multiple blocks have been arranged to form a building structure, the decorative surface is usually the only surface visible. However, other surfaces may also be treated according to the needs of a particular application. For example, corner and end pieces may have two or more exposed surfaces following formation of the building structure. In some cases, opposing surfaces such as surface 102 and surface 104 may remain visible after construction, such as where the blocks are used to form a partition wall that remains visible from either side of the wall following construction. In such cases, both surfaces may have or include a plaster treatment.

As explained in greater detail below, the plaster composition 114 is formulated to provide an aesthetic appearance resembling that of cut stone. The base block materials (i.e., block substrates) and the manufacturing methods used to form the architectural blocks provide a less expensive alternative to real cut stone. Further, using real cut stone may involve difficulties in finding a proper supply of stone. In other words, the use of real stone may require an extensive search for a proper supply that meets size and/or composition and/or aesthetic requirements. On the other hand, the architectural block products described herein are capable of controlled manufacture according to particular project requirements.

In some embodiments, architectural blocks may also be provided at a weight that is significantly less than real stone. Architectural blocks may therefore provide the aesthetic benefits of real cut stone while reducing limitations associated with cost, weight, and/or supply of real stone. In addition, holes running through architectural blocks permit use of reinforcing rebar, interior bonding concrete or mortar, and the like.

II. Plaster Compositions

The plaster composition may be formulated to include: 1) a cementitious binder component, 2) an aggregate component, preferably including at least two type and/or gradations of aggregate (e.g., limestone and/or silica aggregates), and optionally 3) an adhesive component. The plaster composition may be applied to a block to form a decorative surface 114, such as shown in FIG. 1. In other implementations, the plaster composition may be applied directly to an existing substrate/surface such as an exterior or interior wall, floor, or ceiling. The substrate/surface may be cement board, drywall, polymer, or concrete structure, for example.

The cementitious binder component is preferably white Portland cement. Although some embodiments may include ordinary (grey) Portland cement, the cementitious binder component is preferably 50% or more, 60% or more, 75% or more, or 90% or more, or 95% or more, or about 100% white Portland cement. A supplementary cementitious material may optionally be included, examples of which include fly ash, ground granulated blast furnace slag (GGBFS), metakaolin, silica fume, pumice, ground glass, and natural pozzolan. The cementitious binder component may make up about 15% to 45%, or more preferably about 20% to 40% (e.g., about 25% to 35%) of the weight of the plaster composition (excluding water).

The aggregate component may make up about 55% to 85%, or more preferably about 60% to 80% (e.g., about 65% to 75%) of the weight of the plaster composition (excluding water). The aggregate component preferably includes at least two gradations of aggregate material. Beneficial results closely resembling the appearance of real cut stone have been shown when both a fine sand and a coarse sand are included in the aggregate component of the plaster.

The aggregate may include one or more gradations of limestone, one or more gradations of silica, or a combination thereof. Limestone is softer than silica and may be easier to sand. Silica may provide a more defined crystal structure and greater strength. An aggregate may include, for example, a fine limestone portion, and a coarse limestone and/or silica portion.

As used herein, the "fine" or "fine sand" portion of the aggregate is a sand having a D90 of about 0.425 mm or less (i.e., 90% or more of the material passes through a 40 mesh sieve), or about 0.300 mm or less (i.e., 90% or more of the material passes through a 50 mesh sieve) or even about 0.212 mm or less (i.e., 90% or more of the material passes through a 70 mesh sieve). For example, the D90 of the fine sand portion may be within a range of about 0.075 mm to 0.425 mm, or about 0.105 mm to 0.300 mm, or about 0.150 mm to 0.212 mm. The fine sand portion may also have a D50 that is about 0.075 mm or less (i.e., 50% or more of the material passes through a 200 mesh sieve). The fine sand may also be considered to be a filler rather than an SCM.

As used herein, the "coarse" or "coarse sand" portion of the aggregate is a sand or other particle having a D90 of greater than about 0.425 mm (i.e., less than 90% of material passes through a 40 mesh sieve), or greater than about 0.60 mm (i.e., less than 90% of material passes through a 30 mesh sieve). For example, the D90 of the coarse sand portion may be within a range of about 0.425 mm to 2.80 mm, or about 0.60 mm to 1.70 mm. The coarse sand portion may have a D50 within a range of about 0.212 mm to 0.60 mm, or about 0.300 mm to 0.425 mm. In addition, the coarse sand portion may have a D10 within a range of about 0.075 mm to 0.212 mm, or about 0.105 mm to 0.150 mm.

Plaster compositions having aggregates with such fine and coarse sand portions have been found to effectively provide the appearance of cut stone. The fine sand portion enables effective application of the plaster to the treated surface and facilitates even coverage of the treated surface. At the same time, the coarse sand portion provides visible crystal facets that can be exposed following finish work (e.g., sanding and/or polishing) of the treated surface. These visible crystals resemble the appearance of crystals within real cut stone.

Adjusting the ratio of the fine aggregate portion to the coarse aggregate portion can enhance the resemblance to real cut stone. For example, the appearance of the treated surface was found to resemble real cut stone when the ratio of the fine aggregate portion to the coarse aggregate portion is about 1:9 to about 5:5, or more preferably about 2:8 to about 4:6. For example the fine aggregate portion may make up about 10% to about 50%, or about 20% to about 45%, or about 25% to about 40% of the weight of the aggregate component of the plaster composition, and the remainder may be made up of the coarse aggregate portion. These ratios were found to beneficially balance the different features of the fine and coarse aggregate portions to result in a plaster composition having good workability, finishability, and resemblance to real cut stone.

In some embodiments, the plaster composition may further include an adhesive component. The plaster composition may include an adhesive in an amount ranging from about 2% to 10%, or about 3% to 9%, or about 4% to 8% of the weight of the plaster composition (excluding water). In a preferred embodiment, the adhesive component is a latex or latex-based adhesive (e.g., polyvinyl acetate, polyvinyl alcohol, and the like), though other embodiments may additionally or alternatively utilize other adhesives such as those based on styrene, acrylonitrile, natural rubber, neoprene, polyurethane, and combinations thereof.

Inclusion of an adhesive component has been found to enhance the internal integrity of the plaster after it cures on the treated substrate surface. Additionally, the adhesive component aids in maintaining good contact and bond between the plaster composition and the treated substrate surface so that effective coverage and bonding can occur. It can also minimize sloughing, buckling, or other undesirable artifacts from occurring during application of the plaster composition, which thereby reduces the occurrence of these artifacts in the finished, cured product.

One or more additional components may also be included in the plaster composition to aid in application and/or to provide desired properties to the finished, cured product. For example, one or more dyes or colorants (e.g., white, cream, tan, brown, orange, red, etcetera) may be included to provide a desired color scheme to the plaster and further aid in reproducing the appearance of real cut stone. A set retarder used to slow down cement hydration can be included to extend working time of the plaster. In addition, or alternatively, a set accelerator may be included. Water reducers and/or other admixtures known in the art can be included.

III. System and Method for Manufacture of Architectural Blocks

Figure 2:
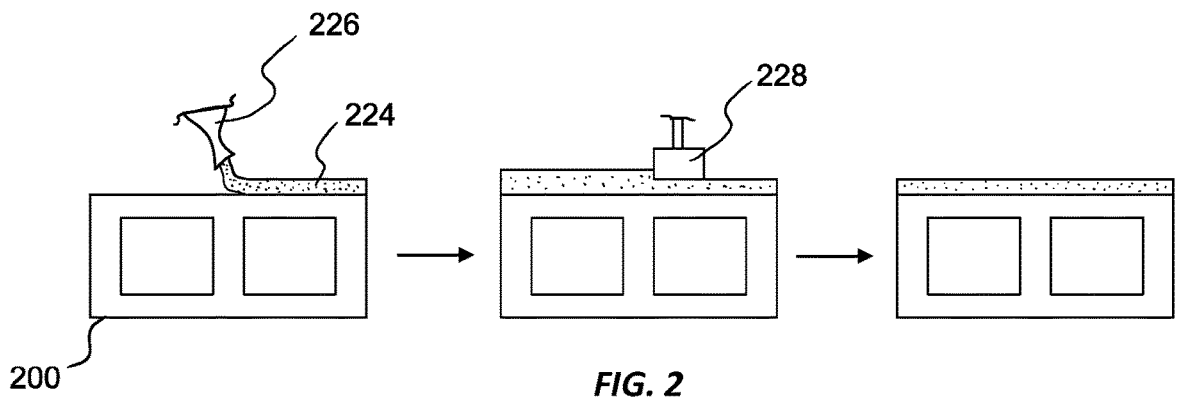
FIGS. 2 through 4 illustrate an exemplary manufacturing process and system for forming an architectural block, such as shown in FIG. 1.
Figure 3:
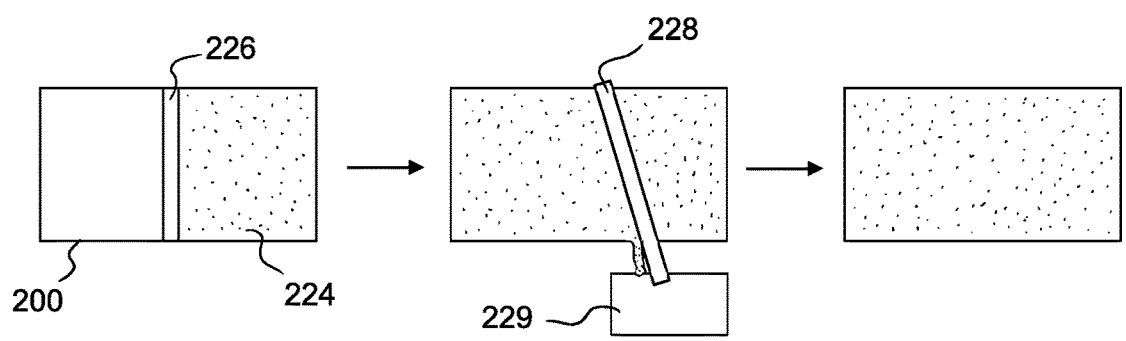

FIGS. 2 and 3 illustrate a side view and a top view, respectively, of one exemplary embodiment of a manufacturing system and related process for manufacturing architectural blocks such as architectural block 100 of FIG. 1. As shown, a series of unmodified blocks (or block substrates) 200 are conveyed toward a series of modifying machines. The blocks may be conveyed using a conveyor belt, a roller conveyor, slide conveyor, or other suitable mechanism for moving the unmodified blocks 200 relative to a series of modifying machines. Additionally, or alternatively, the modifying machines may be configured to move relative to the series of blocks 200, though typically it will be more straightforward to convey the blocks 200 relative to stationary machinery. In addition, although the machinery is oriented in the illustrated embodiment to apply plaster to an upper surface of the blocks 200, it will be understood that the same mechanisms may be oriented on a side or bottom surface of the blocks 200.

In a first step, the block substrate 200 first passes an applicator 226, which applies an amount of the plaster composition to a surface of the block substrate 200 to form an intermediate product having a plaster layer 224. The applicator 226 may be formed as a chute, for example. Following application of the plaster composition, the block substrate 200 is moved toward and past a leveler 228. The leveler 228 may be a blade, bar, edge, or other such structure capable of sloughing off excess plaster from the treated surface of the block substrate 200. The leveler 228 is positioned with a predetermined gap between the treatment surface and the lower extent of the leveler 228. Excess plaster sloughed off by the leveler 228 may be collected in a collection bin 229. The thickness of the plaster layer 224 may be set according to design preferences or particular application needs. Typically, effective results are seen with a plaster layer thickness of about ⅛ inch to ¼ inch, although thicknesses greater than ¼ inch or less than ⅛ inch are certainly within the scope of the disclosure.

Following the leveling step, the leveled block 200 may then be conveyed to a holding area to allow the plaster layer 224 to harden or cure. The curing time period can be for about 12 hours to 7 days, but usually about 24 hours is sufficient hardening before the coated blocks can be handled (although cementitious compositions may continue building strength for weeks or months, especially when exposed to moisture).

Figure 4:
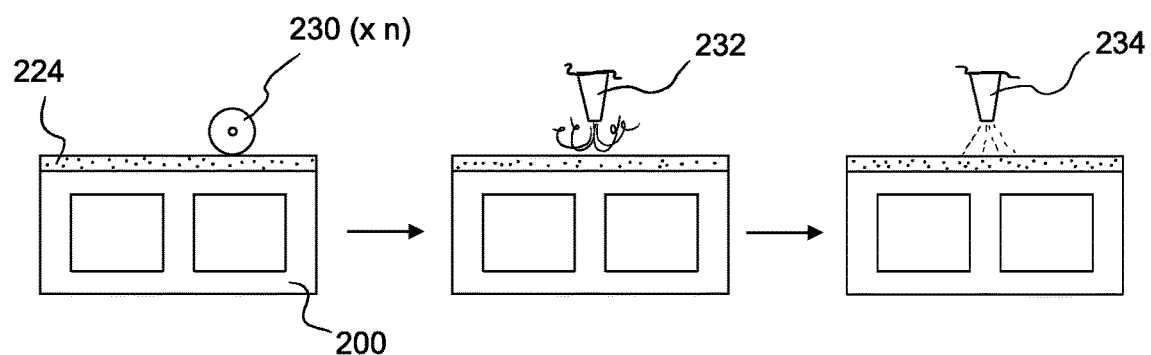

FIG. 4 illustrates additional processing steps that may be carried out on the block 200 following hardening or curing of the plaster layer 224. As shown, the block 200 may be conveyed to one or more finishers 230. The finisher(s) may be sanders (e.g., belt sanders or orbital sanders), grinders, or polishing devices such as a lapping device with a suitable abrasive, for example. The (x n) illustrated in FIG. 4 represents the fact that additional finishers may be included.

For example, the block 200 may first pass through a coarse grade sander followed by one or more progressively finer grade sanders.

As described above, the beneficial formulation of the plaster composition 224 in combination with the finishing process enables the finished surface of the plaster 224 to resemble real cut stone. In particular, after passing through the one or more finishers 230, the finished surface of the plaster 224 can include visible crystal facets of appropriate size distributed across the treated surface in a manner that resembles real cut stone.

Following finishing of the plaster surface, the block 200 may be moved past a cleaner 232. The cleaner 232 may be configured to discharge compressed air, and/or water, and/or other suitable fluid to clean the surface of the plaster 224. Other embodiments may additionally or alternatively utilize one or more brushes or vacuum devices, for example, to remove residual dust/debris from the treated surface. The block 200 may then be conveyed to a sealer 234 configured to apply a polymer sealant to the treated surface. The sealer 234 may utilize a sprayer and/or roller brush, for example, to apply the polymer sealant to the treated surface of the plaster 224.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of manufacturing an architectural block adapted to give the appearance of cut stone, the method comprising:
    providing a block substrate;
    placing a plaster composition comprising a cementitious binder, water, and an aggregate component into an applicator chute;
    moving the block substrate on a conveyor under the applicator chute;
    the applicator chute applying the plaster composition to a surface of the block substrate to form a plaster layer;
    moving the block substrate with the plaster layer on the conveyor under a leveler which levels the plaster layer and removes excess plaster from an outer surface of the plaster layer; and
    allowing the plaster layer to harden or cure to form a hardened plaster layer,
    the hardened plaster layer being formulated to resemble cut stone when applied to the surface of the block substrate and allowed to harden or cure.

2. The method of claim 1, wherein the leveler is selected from a blade, a bar, an edge, and means for leveling the plaster layer and removing excess plaster from the outer surface of the plaster layer.

3. The method of claim 1, further comprising finishing an outer surface of the plaster layer using one or more finishers.

4. The method of claim 3, wherein the one or more finishers comprise one or more sanders and/or one or more polishers.

5. The method of claim 4, wherein the finishing comprises successively sanding and/or polishing the outer surface of the plaster layer with progressively finer sanders and/or polishers.

6. The method of claim 4, after finishing the outer surface of the plaster layer using one or more sanders and/or polishers, the method further comprising applying a polymer sealer to the finished outer surface of the plaster layer, optionally following cleaning of the finished outer surface.

7. The method of claim 4, after finishing the outer surface of the plaster layer using one or more sanders and/or polishers, the method further comprising cleaning the finished outer surface of the plaster layer using at least one of compressed air or water.

8. The method of claim 1, wherein:
    the cementitious binder component is selected from Portland cement, white cement, and optionally one or more supplementary cementitious materials (SCMs); and
    the aggregate component comprises a limestone and/or silica aggregate that includes at least two gradations of aggregate.

9. The method of claim 8, wherein the cementitious binder component comprises at least about 50% white cement and one or more SCMs.

10. The method of claim 8, wherein the cementitious binder component makes up about 15% to 45% of the dry weight of the plaster composition.

11. The method of claim 8, wherein the aggregate component makes up about 55% to 85% of the dry weight of the plaster composition.

12. The method of claim 8, wherein the aggregate component includes a fine sand portion and a coarse sand portion, wherein the fine sand portion has a D90 within a range of about 0.075 mm to 0.425 mm, and wherein the coarse sand portion has a D90 within a range of about 0.425 mm to 2.80 mm.

13. The method of claim 8, wherein the plaster composition further comprises an adhesive component in an amount ranging from about 2% to 10% of the dry weight of the plaster composition.

14. The method of claim 8, wherein the plaster composition further comprises a set retarder.

15. The method of claim 8, wherein the plaster composition further comprises a water reducer.

16. A method of manufacturing an architectural block adapted to give the appearance of cut stone, the method comprising:
    providing a block substrate;
    applying a plaster composition to at least one surface of the block substrate to form a plaster layer, the plaster composition comprising;
        a cementitious binder component selected from Portland cement, white cement, and optionally one or more supplementary cementitious materials (SCMs); water; and
        an aggregate component including at least two gradations of aggregate, including a fine sand portion and a coarse sand portion, wherein the fine sand portion has a D90 within a range of about 0.075 mm to 0.425 mm and the coarse sand portion has a D90 within a range of about 0.425 mm to 2.80 mm;
    leveling the plaster layer;
    allowing the plaster layer to harden or cure to form a hardened plaster layer; and
    finishing the plaster layer using one or more finishers selected from one or more sanders and/or one or more polishers,
    the plaster layer being formulated to resemble cut stone when applied to the surface of the block substrate and allowed to harden or cure.

17. The method of claim 16, after finishing the plaster layer using one or more sanders and/or polishers, the method further comprising applying a sealer to the finished outer surface of the plaster layer, optionally following cleaning of the finished outer surface using compressed air and/or water.

18. A method of manufacturing an architectural product adapted to give the appearance of cut stone, the method comprising:
providing a substrate selected from a concrete block, cement board, drywall, polymer, or concrete structure;
applying a plaster composition to at least one surface of the block substrate to form a plaster layer, the plaster composition comprising;
a cementitious binder component selected from Portland cement, white cement, and optionally one or more supplementary cementitious materials (SCMs);
water;
a water reducer;
a latex or latex-based adhesive; and
an aggregate component including at least two gradations of aggregate, including a fine sand portion and a coarse sand portion, wherein the fine sand portion has a D90 within a range of about 0.075 mm to 0.425 mm and the coarse sand portion has a D90 within a range of about 0.425 mm to 2.80 mm;
leveling the plaster layer;
allowing the plaster layer to harden or cure to form a hardened plaster layer; and
finishing the plaster layer using one or more finishers selected from one or more sanders and/or one or more polishers,
the plaster layer being formulated to resemble cut stone when applied to the surface of the substrate and allowed to harden or cure.

19. The method of claim 18, wherein the latex or latex-based adhesive comprises at least one of polyvinyl acetate or polyvinyl alcohol.

20. The method of claim 18, wherein the cementitious binder component comprises white cement and one or more SCMs selected from the group consisting of fly ash, metakaolin, pumice, natural pozzolan, ground granulated blast furnace slag, and silica fume.

* * * * *